Jan. 31, 1967   J. M. MOODY   3,301,173
TEXTURIZING OF FLEXIBLE MATERIALS
Filed Oct. 21, 1965   2 Sheets-Sheet 1

INVENTOR.
JACKIE M. MOODY

3,301,173
TEXTURIZING OF FLEXIBLE MATERIALS
Jackie M. Moody, North Charleston, S.C., assignor to Clupak, Inc., New York, N.Y., a corporation of Delaware
Filed Oct. 21, 1965, Ser. No. 499,774
3 Claims. (Cl. 101—23)

The present invention relates generally to the production of flexible materials, and more particularly, to a method for texturizing webs, sheets, films and the like.

There are a number of known ways to produce a textured surface on flexible materials such as, for example, paper, tissues, and non-wovens. In one of the methods known to the present inventor, the desired texture is produced by use of embossing rolls to emboss a pattern and to get an open structure. The embossing subjects the material being processed to localized stretching and often cuts or tears the material. Not only does this local stretching and tearing weaken the material, but also it makes a fine well defined pattern somewhat difficult to achieve. In another known method for producing a texture in a flexible material, for example, in the production of paper, a pattern is impressed upon the paper web while it is in the wet stage. This usually results in localized crushing of the paper. Since the web is in a highly plastic state, fineness of pattern may be difficult to achieve. Another known method consists of compressive shrinking of fabric while the fabric is in contact with a smooth but buckleable material so that the buckling is transferred to the fabric. This method of producing a texture has several serious disadvantages. One is that the buckleable material is expended in one pass and is not re-usable, making the method economically unfeasible. Another disadvantage is that the ornamentation is quite random, and is controllable only to a limited extent. The choice of ornamentation is limited merely to some type of buckling effect.

The present invention will be discussed with many references to texture and texturizing. These terms will be used to refer to a predetermined pattern in relief with various degrees of projection from a plane of reference and to the producing of such pattern in flat materials.

One feature of the present invention is that it is adaptable to the imparting of a wide variety of predetermined textured patterns to many different types of materials. Another feature is that a very fine, well defined textured pattern can be produced without localized tearing or cutting of the material. The texturizing can be carried out without loss in strength and generally results in increased strength and toughness. Another feature is that a material can be simultaneously printed upon and texturized.

The inventor recognized the need for an improved means whereby a texture could be imparted to a flexible material in a variety of fine and well defined patterns. He realized the limitations inherent in the prior art methods which made fine and well defined patterns difficult or impossible to achieve without seriously impairing the strength of the material. He knew also of the difficulties encountered when efforts were made to simultaneously emboss and print upon a material.

Therefore, it is an object of the present invention to provide an apparatus and method for imparting a textured pattern to a flexible material.

A further object is to provide a method for texturizing a flexible material which does not locally stretch or cut the material.

Another object is to provide a method of texturizing flexible material which increases the toughness of the material.

Another object is to provide a method and apparatus for imparting a textured pattern to a flexible material while simultaneously imprinting a design thereon.

A further object is to provide a means whereby both sides of a flexible material may be texturized in a single operational step.

To accomplish the foregoing and other objects of the present invention, the invention comprises the features hereinafter described and particularly set out in the claims, the description setting forth in detail certain illustrative embodiments of the invention. These embodiments are set out to show some of the ways in which the principles of the invention may be employed.

For a more complete understanding of the present invention, reference should be made to the drawings, wherein.

The drawings are to be understood to be more or less of a diagrammatic character for the purposes of illustration. Like characters identify the various elements in the several views.

Figure 1:
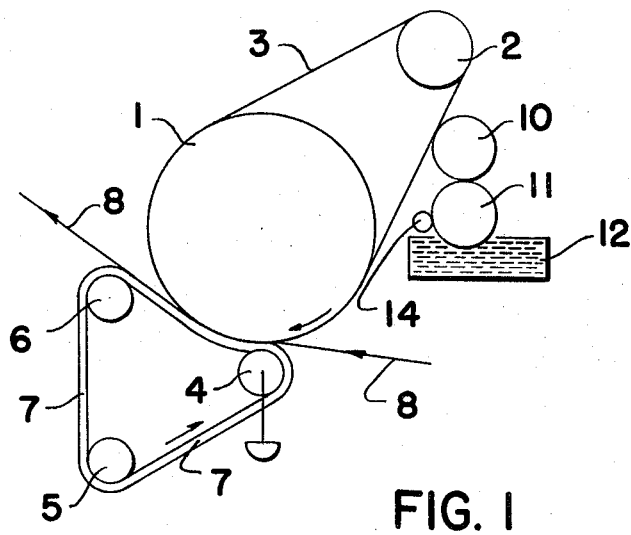
FIGURE 1 is a schematic elevation of an apparatus constructed in accordance with the principles of the present invention.

An apparatus is shown in FIGURE 1 which includes rolls 1, 2, 4, 5, and 6. Roll 1 is a driver and ordinarily would be mounted rotatably on fixed bearing means about its axes. The drive means and details of the bearing means are not included in the figure as they are well known. Rolls 2, 4, 5, and 6 are idler rolls rotatable about their axes. Rolls 1 and 2 support an endless fabric belt 3. Roll 2 may be made adjustable in relation to the driver to allow adjustment of the belt tension and replacement of the belt. Rolls 4, 5 and 6 support an elastomeric endless belt 7. The forementioned rolls are all located on substantially parallel axes. The driver 1 and idler or nip roll 4 are located so that there is an engagement of the two endless belts to form a pressure nip. The nip roll 4 may be mounted so that its axis may be moved in relation to the driver roll to adjust the nip pressure. The nature of this nip will be discussed more fully in subsequent paragraphs.

The endless belt 7 is made of an elastomeric material, for example, rubber. The belt may also be constructed with a strong, inextensible backing layer having an elastomeric surface layer. The surface of the belt must be of sufficient hardness to prevent creping of a web 8 when the web is passed through the nip under operating conditions. The surface of the elastomeric belt is substantially smooth. For example, the belt may be dressed with an 80 grit or higher grinding abrasive.

In the apparatus of FIGURE 1, belt 3 is constructed of a suitable high tenacity woven filament such as polyester, nylon or rubberized material. Belt 3 must be capable of contracting as it passes through the nip and of thereafter regaining its original surface dimension. The belt must be sufficiently durable to withstand the repeated contracting and stretching to which it is subjected.

As belt 7 moves from roll 5 to roll 4, the outer elastomeric surface is convexly curved and stretched as it begins to pass over roll 4. The surface subsequently becomes curved in the opposite direction when passing through the nip and is caused to shorten in its surface or planar dimension.

Figure 2:
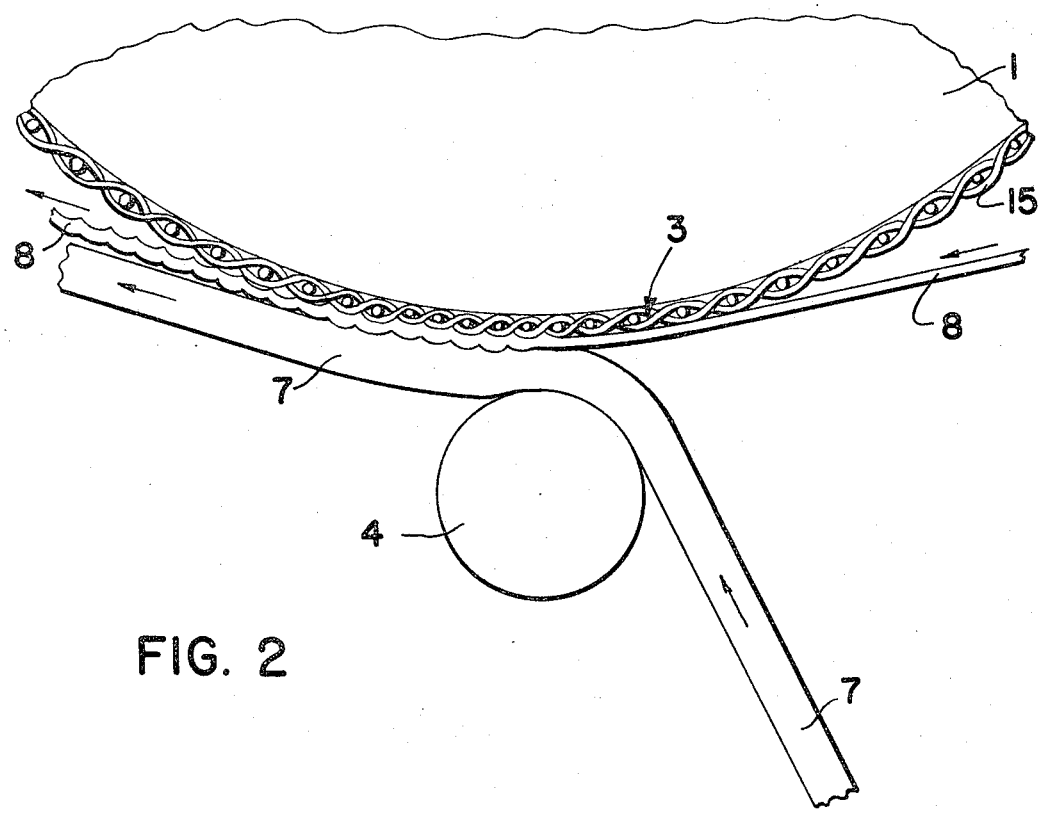
FIGURE 2 is a detailed cross-sectional elevation of a part of the apparatus of FIGURE 1.

FIGURE 2 is a typical detail of the nip area as it would appear in a cross-section taken through a plane normal to the axes of the rolls. The elastomeric belt 7 is shown along with web 8 and belt 3. A high enough pressure is exerted on the surface of the web by elastomeric belt 7 to support the web against creping as it passes through the nip. It has been found that a surface durometer hardness in the range of from 40 to 60 is suitable in most cases. The application of external pressure is indicated in FIGURE 2 by arrows F which lie on the imaginary line connecting the axes of the engaging rolls 1 and 4. The required nip pressure can be readily determined in a given instance by examining the results of selected inspection runs.

As the belt 7 passes around roll 1, it is compressed and becomes concavely curved and this situation causes the surface dimension of the belt in its direction of travel to be reduced. Said another way, the belt is caused to shorten in its length. The web 8 is caused to shorten as is belt 3 due to the forces applied parallel to their respective surfaces by the shortening of the elastomeric belt with which they are in frictional contact, the direct contact being between the web and the elastomeric surface and between the web and the surface of belt 3.

At the point where the web enters the nip, the elastomeric belt exhibits maximum distortion and the potential energy stored in the belt as a result of this distortion at the entry to the nip is released in the nip. In the nip, the web is subjected to simultaneously applied forces acting generally perpendicular to the opposed web surfaces and generally parallel to the web surfaces. The web is gathered into the mold formed by the surfaces of the belts as the belts contract. It is apparent that, in order for this gathering to take place, belt 3 must be capable of following the dimensional changes that occur in the surface of the elastomeric belt 7 in the nip.

In FIGURE 2, the filaments of the woven belt 3 are shown in schematic representation as 15. The web is simultaneously urged into the interstices between the filaments and gathered as the filaments running in the direction of travel shorten and cause the spaces between the lengthwise filaments to contract due to the forces acting parallel to the surface of the belt. Forces acting generally perpendicular to the web surfaces continuously support the belt in the nip. These forces sustain the web against buckling. As seen in FIGURE 2, the web 8 is urged tightly against the surfaces of the fabric belt filaments 15 by action of the elastomeric belt so that there are no unsupported sections of the web which could collapse or buckle.

As the fabric belt emerges from the nip, it begins to stretch and eventually recovers to its original length.

Referring again to FIGURE 1, means are shown whereby the web can be dyed or printed upon during its travel through the nip.

A pick-up pan 12 is shown along with a pick-up roll 11. A dye, pigment or the like 13, stored in the pan, is picked up by roll 11 and carried to a transfer or offset roll 10 which engages with roll 11. The surface of transfer roll 10 passes in contact with the surface of the woven belt 3, and the dye, pigment or the like, hereinafter referred to as the pigment, is thereby caused to adhere to the surface of the woven belt. A metering roll 14 is provided to regulate the amount being transferred to the woven web. Means are provided to maintain temperature and good mixing in the pan.

FIGURE 1 shows one way of applying a pigment or the like to the texturizing belt 3. Various other methods may be used for this purpose, for example, a flexible blade which rides against the belt or a regulated spray means. The details of these and other such methods are well known in the art.

The pigment is applied to the belt 3 at an intermediate point prior to the passing of the belt through the pressure nip. Where necessary, or desired, means may be provided for preventing build-up of pigment on the texturizing belt. For example, a bath and squeeze rolls could be used. The amount of pigment necessary will vary, for example, with the type of belt, the character of the web, the type of pigment, and the results desired, but may be easily found by proof runs in a particular case.

Referring to FIGURE 1, the belt 3 operates in relation to the web 8 much like roll 10 in relation to the belt, that is, the pigment applied to the belt is offset on the web as the web passes through the nip. It is apparent that the printing or dyeing takes place simultaneously with the texturizing of the web. One advantage of this concurrence of the two processes is that the print is not "out of register" with the textured pattern. Printing on the web after the texturizing would be difficult due to the varying degrees of projection or "roughness" of the surface of the web. The present inventor discovered that when printing was carried out simultaneously with the texturizing, the pigment was offset to the web in varying amounts generally in relation to the various degrees of projection of the textured surfaces of the web. He recognized that the resulting product was superior to those other similar products which he had seen.

The inventor found that various desirable effects could be achieved with webs of various thicknesses and densities. Where the pigment "strikes through" the web, for example, a two sided product is achieved which enhances the appearance of the web as viewed from the side contacting the elastomeric belt.

Figure 3:
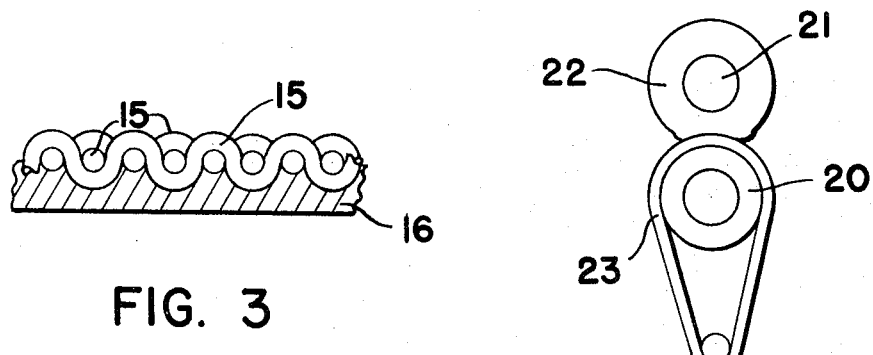
FIGURE 3 is a detail in cross-section of a woven belt having a backing layer.

In the foregoing example, the belt 3 was simply a fabric material utilized with a hard backing roll. An alternate construction of the texturizing belt to provide durability is shown schematically in FIGURE 3. Referring now to FIGURE 3, the filaments 15 of a woven belt are partially embedded in an elastomeric backing layer 16 to produce what may be termed a composite belt. The backing layer may be of any suitable material such as rubber or the like. The backing layer must permit the expansion and contraction of the filaments so that the desired gathering of the web may be accomplished.

Figure 4:
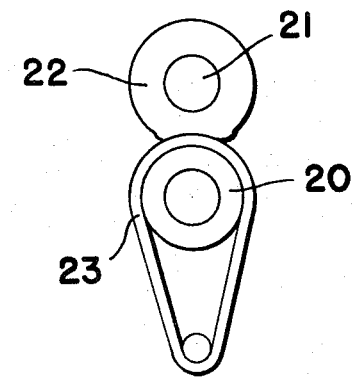
FIGURE 4 is an illustration of a two roll apparatus constructed in accordance with the principles of this invention.

The example of FIGURE 1 is one type of apparatus which could be used to carry out the process of the present invention. FIGURE 4 shows another apparatus which may be used. Referring to FIGURE 4, a first roll 20 and a second roll 21 lie adjacent each other along parallel axes. Both rolls are rotatably mounted on their respective axes. Means, not shown, are provided for adjusting the distance between the axes of the rolls. Both rolls are made of hard metal. Roll 21 is surfaced with a thick elastomeric layer 22 having a substantially smooth outer surface. Roll 20 carries an endless woven belt 23. This belt may be made of an elastomeric layer having partially embedded in it a woven filament to produce a composite belt such as is shown in detail in FIGURE 3. Belt 23 may typically be woven of polyester or natural filaments. If a backing is employed, such as the one shown in FIGURE 3, it may be typically of rubber. Belts may be interchanged on the roll 20 to impart a variety of patterns.

The texturizing belt has been referred to as a woven belt for the purposes of example. It will be realized, that many types of belts may be used, for example, any of the wide variety of fabric designs available.

Means similar to that described with reference to FIGURE 1 may be employed in combination with the apparatus of FIGURE 4 to allow simultaneous printing and texturizing of the web.

The process of the present invention may be operated at various moisture and temperature conditions. The most desirable conditions will depend to a large extent on the material being processed. Kraft paper would be advantageously processed in a relatively wet state of from approximately 30% to 45% moisture, whereas tissue or soft thin paper may be treated at a lower moisture and, in some particular instances, substantially dry.

In experimental runs, with tissue, a rather fine "linen" weave cloth was used as well as a rather large "burlap" weave. Printing on the tissue simultaneously with the texturizing, provided a product which may more closely resemble the particular cloth used.

A beneficial feature of the process is that the material processed has a higher strength compared to an embossed product due to the absence of cutting or crushing and the minimizing of local stretching coupled with the additional effect of compaction. There is no appreciable disturbance of the fibrous network, such as is encountered in embossing, which would tend to weaken the material. Another advantage over embossing should prove to be elimination of expensive embossing rolls which are difficult to maintain, the rolls being replaced by relatively less expensive belts which are easy to maintain. Speeds at which texturizing can be accomplished by means of the present invention are well over 2000 feet per minute which the inventor believes is above speeds found to be presently practical in commercial embossing operations.

Examples of the way in which characteristics of webs may be enhanced by the texturizing process of this invention are shown in the following table:

| Run No. | MD Tensile, Lb. Per In. | MD Stretch, Percent | MD Toughness In Lb. Per Sq. In. | Caliper, In. |
|---|---|---|---|---|
| 1399 | 2.4 | 14.3 | 0.18 | 0.0051 |
| Control | 2.8 | 7.4 | 0.16 | 0.0080 |
| 1400 | 9.2 | 7.6 | 0.31 | 0.0093 |
| Control | 10.8 | 4.5 | 0.36 | 0.0070 |
| 1401 | 18.3 | 19.6 | 0.96 | 0.0081 |
| Control | 22.0 | 1.8 | 0.22 | 0.0040 |

In each of the above cases, an elastomeric belt of about 50 durometer hardness rubber was used. The fabric belt was a thin cotton weave. The blanket nip was about 10%. The kraft paper had a moisture content of approximately 30% when processed. The other papers were substantially dry when processed. In each case a distinct pattern was imparted to the web which made the web appear to be a woven material. The overall result is quite different from many known methods such as embossing which weaken the web.

Figure 5:
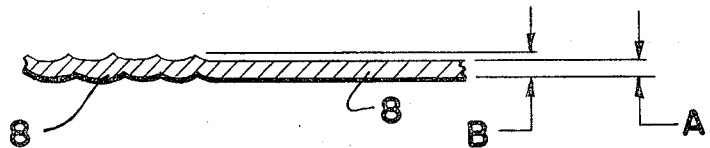
FIGURE 5 is a cross-section of a partially processed sheet.

FIGURE 5 is a schematic cross-section of a sheet 8 partially processed according to the principles of this invention. The figure illustrates how the caliper of the sheet may be increased. The dimension A is initial caliper and the dimension B is caliper after texturizing. In one experimental run, a .003 inch sheet was increased to .005 inch.

FIGURE 5 shows also that the effect is two-sided. The figure is a schematic to show increased caliper. In an actual case, the texture on opposing faces of the sheet would be more uniform. This two-sidedness imparts antiskid characteristics to both surfaces of the sheet. It is created in a single pass through the pressure nip so that a texture is imparted to both sides of the sheet in one operational step.

The present invention has been described with reference to specific apparatus; however, it will be appreciated that a wide variety of changes may be made both in apparatus and method. For example, certain features of the apparatus and method may be utilized independently of others and equivalents may be substituted for the various apparatus and components thereof and method steps, all within the spirit and scope of the invention as defined in the appended claims.

I claim:
1. An apparatus for texturizing a flat web comprising in combination: a first mounted rigid rotatable roll; a second mounted rigid rotatable roll, said second roll having its axis parallel to the axis of said first roll and located so as to form a pressure nip between it and said first roll; a woven endless belt mounted so as to pass through the pressure nip, said endless belt formed from filaments capable of shortening and stretching; a generally smooth elastomeric surface mounted so as to pass through said pressure nip; and means for moving said surface and said belt, said means including means for shortening the elastomeric surface in the nip cause a generally corresponding shortening of the woven belt in the nip area.

2. The apparatus of claim 1 including means for applying pigment to said woven belt prior to the entry of the belt into the nip.

3. An apparatus for texturizing a flat web comprising in combination: a first mounted rigid rotatable roll; a second mounted rigid rotatable roll, said second roll having its axis parallel to the axis of said first roll and located so as to form a pressure nip between it and said first roll; a woven endless belt mounted so as to pass through the pressure nip, said woven endless belt formed from filaments capable of shortening and stretching; an endless blanket having a generally smooth elastomeric surface and mounted so as to pass partially around each of said rolls and through said pressure nip; and means for moving said blanket and said belt, whereby shortening of the elastomeric surface which occurs due to the change of curvature of the elastomeric surface in the nip causes a generally corresponding shortening of the woven belt in the pressure nip area.

References Cited by the Examiner

UNITED STATES PATENTS

| | | | |
|---|---|---|---|
| 484,966 | 10/1892 | Karfiol | 101—23 |
| 680,533 | 8/1901 | Marinier et al. | 101—23 |
| 1,060,387 | 4/1913 | Wait | 101—23 |
| 1,669,885 | 5/1928 | Webb et al. | 101—23 |
| 1,985,480 | 12/1934 | Carpenter. | |
| 2,528,540 | 11/1950 | Oldofredi | 101—32 |
| 2,593,149 | 4/1952 | Illner | 101—23 |
| 2,972,297 | 2/1961 | Auerbacher | 101—181 |
| 3,188,948 | 6/1965 | Fischer et al. | |

ROBERT E. PULFREY, *Primary Examiner.*

W. F. McCARTHY, *Assistant Examiner.*